R. EDMONDS.
BALL BEARING CASTER.
APPLICATION FILED NOV. 14, 1916.
1,233,330.
Patented July 17, 1917.
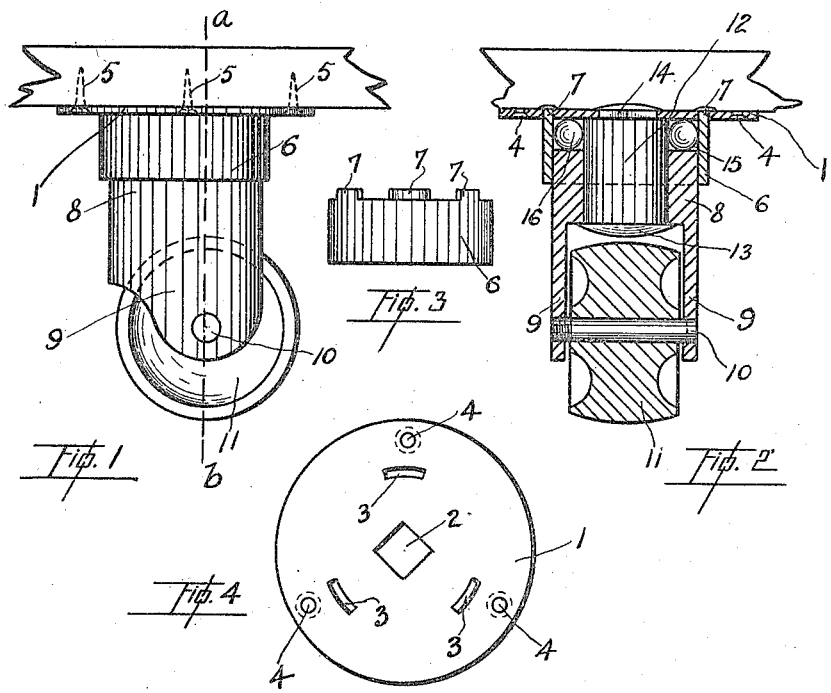
INVENTOR.
ROLAND EDMONDS.
BY Featherstonhaugh Co.
ATT'YS

UNITED STATES PATENT OFFICE.

ROLAND EDMONDS, OF VANCOUVER, BRITISH COLUMBIA, CANADA, ASSIGNOR OF ONE-THIRD TO LAWRENCE BRAIM AND ONE-THIRD TO VERNON CHARLES CROFTS, BOTH OF VANCOUVER, BRITISH COLUMBIA, CANADA.

BALL-BEARING CASTER.

1,233,330.　　　Specification of Letters Patent.　　Patented July 17, 1917.

Original application filed August 23, 1916, Serial No. 116,514. Divided and this application filed November 14, 1916. Serial No. 131,300.

*To all whom it may concern:*

Be it known that I, ROLAND EDMONDS, a subject of the King of Great Britain, and a resident of the city of Vancouver, in the Province of British Columbia, Canada, have invented certain new and useful Improvements in Ball-Bearing Casters, of which the following is a specification.

My invention relates to improvements in casters, with more particular reference to casters adapted for attachment to flat surfaces of heavy furniture, and the object of my invention is to devise a simple, practical, and durable caster capable of being manufactured and sold at a low cost, in which the friction and strain are both reduced to the minimum, which is easily assembled and disassembled, and which is dust proof, thereby providing for the maintenance of the device in a highly efficient condition at all times. A further object is to provide a caster in which the caster wheel is brought almost directly under the center of the load, that is to say, under the actual center of the bearing around which the caster turns, so that an even distribution of the weight on the point of support is obtained. This is a divisional case from application No. 116,514, filed August 23, 1916.

I attain these objects by the construction illustrated in the accompanying drawings in which—

Figure 1 is a side elevation of the caster.

Fig. 2 is a vertical section on the line *a—b* of Fig. 1.

Fig. 3 is a detail view of the collar.

Fig. 4 is a detail view of the attaching plate.

Similar figures of reference indicate similar parts throughout the several views.

1 indicates a plate provided with a central opening 2, which may be of any form, and the slots 3, and having countersink holes 4 through which screws may be passed to secure the plate to the furniture, the screws being shown dotted, as at 5 in Fig. 1. 6 indicates a collar provided on its upper edge with projections 7 which are adapted to fit into the slots 3 and to be riveted over so as to rigidly secure the collar 6 to the plate.

Fitting rotatably in the bore of the collar so that a close joint is formed therebetween is a sleeve 8, of uniform diameter, and which sleeve is provided with pendent lugs 9 connected together at their lower ends by a shaft 10, upon which shaft is journaled the caster wheel 11. The sleeve 8 is rotatably held in place when the caster is assembled by means of a stem 12 which fits the bore of the sleeve and is riveted over at its lower end so that a head 13 is formed, its upper end being adapted for attachment to the plate 1 in any suitable manner, such as that shown in Figs. 2 and 4, that is, by forming the opening 2 square and by squaring the end of the stem to project through the opening so that it may be riveted into the plate, as indicated by the numeral 14 in Fig. 2. The length of the sleeve 8 is such that, when the device is assembled, a space 15 is formed between the upper end of the sleeve and the inner face of the plate 1, in which space is carried a circular series of anti-friction balls 16, which play freely around the stem 12 and bear both upon the stem and the plate 1.

The operation of the caster, and the manner in which it is used, will be apparent on reference being had to the drawing, as it will be seen that the device, when assembled as shown in Figs. 1 and 2, may be attached to a flat surface by means of screws passed through the holes 4 in the plate 1; that the caster wheel 11 and the sleeve 8 are free to turn about the stem 12; and that the balls 16 play around the stem, bearing both upon the stem and on the underside of the plate. It will be seen further that as the sleeve is a close fit for the bore of the collar, dust and dirt are excluded, so that the caster is dust proof.

What I claim as my invention is:

1. A ball bearing caster comprising, an attaching plate, a collar depending from said plate, a depending stem carried by said plate, a sleeve extending into the bore of said collar, said sleeve being rotatable in the collar and on the stem, and anti-friction balls mounted on the upper end of the sleeve and bearing on said stem and said plate.

2. A ball bearing caster comprising, an attaching plate provided with a central opening and a plurality of slots, a collar provided on its upper edge with a plurality of projections adapted to be secured into said slots, a depending stem extending from the central opening of said plate, a uniform diameter sleeve rotatably mounted on said stem and extending into said collar, and anti-friction balls mounted on the upper end of the sleeve and bearing on the said stem and the said plate.

3. A ball bearing caster comprising, an attaching plate, a collar depending from said plate, a depending stem carried by the plate, means for preventing rotation of the stem, a sleeve extending into the bore of the said collar, said sleeve being rotatable in the collar and on the stem, and anti-friction balls mounted on the upper end of the sleeve and bearing on said stem and said plate.

Dated at Vancouver, B. C., this 8th day of November, 1916.

ROLAND EDMONDS.

Copies of this patent may be obtained for five cents each, by addressing the "Commissioner of Patents, Washington, D. C."